(12) United States Patent
Jiang

(10) Patent No.: US 9,734,255 B2
(45) Date of Patent: Aug. 15, 2017

(54) UBIQUITOUS PERSONALIZED LEARNING EVALUATION NETWORK USING 2D BARCODES

(71) Applicant: Jianfeng Jiang, Fremont, CA (US)

(72) Inventor: Jianfeng Jiang, Fremont, CA (US)

( * ) Notice: Subject to any disclaimer, the term of this patent is extended or adjusted under 35 U.S.C. 154(b) by 0 days.

(21) Appl. No.: 14/545,971

(22) Filed: Jul. 14, 2015

(65) Prior Publication Data
US 2017/0017869 A1 Jan. 19, 2017

(51) Int. Cl.
*G06K 19/06* (2006.01)
*G06F 17/30* (2006.01)

(52) U.S. Cl.
CPC .............. *G06F 17/30879* (2013.01)

(58) Field of Classification Search
CPC .......... G06K 19/06; G06K 19/00; G06K 7/10; G06K 7/14; G06K 9/18; G06K 9/36; G06K 9/80; G06F 17/00
USPC ........ 235/494, 454, 375, 487, 462.09, 462.1
See application file for complete search history.

(56) References Cited

U.S. PATENT DOCUMENTS

| | | | | |
|---|---|---|---|---|
| 8,584,931 B2* | 11/2013 | Kim | ....................... | G06Q 30/02 235/375 |
| 2005/0274804 A1* | 12/2005 | Matsumoto | ............ | G06K 1/121 235/462.01 |
| 2012/0066026 A1* | 3/2012 | Dusig | .................... | G06Q 30/02 705/7.32 |
| 2012/0209686 A1* | 8/2012 | Horowitz | ................ | H04L 67/02 705/14.26 |
| 2013/0005452 A1* | 1/2013 | Chatani | ................... | A63F 13/12 463/29 |
| 2013/0032634 A1* | 2/2013 | McKirdy | ........... | G06Q 30/0271 235/375 |
| 2013/0043302 A1* | 2/2013 | Powlen | .................. | G06Q 50/01 235/375 |
| 2013/0079071 A1* | 3/2013 | Norris | ................... | A63F 13/005 463/2 |
| 2013/0221091 A1* | 8/2013 | Koo | ....................... | G06Q 10/06 235/375 |
| 2013/0227651 A1* | 8/2013 | Schultz | ................... | G06F 21/32 726/4 |
| 2014/0319209 A1* | 10/2014 | Beadles | ............. | G06Q 30/0207 235/375 |
| 2015/0011309 A1* | 1/2015 | Eloff | ....................... | A63F 13/49 463/29 |
| 2015/0046192 A1* | 2/2015 | Raduchel | .............. | G06F 19/323 705/3 |
| 2016/0012465 A1* | 1/2016 | Sharp | ..................... | G06Q 20/18 705/14.17 |

* cited by examiner

*Primary Examiner* — Edwyn Labaze

(57) ABSTRACT

A ubiquitous personalized learning evaluation network with 2D barcodes consists of a data server with User Data Management module and 2D Barcodes Management module, mobile communication devices with 2D barcode scanners, user ID recognition module and task reader, and 2D barcodes whose destination URLs are quizzes or games based on the users skill levels. Once the user scanned the 2D barcodes, and finished the task, the results will be uploaded to the data server to re-evaluate the user's skill level and assign the next proper task.

18 Claims, 9 Drawing Sheets

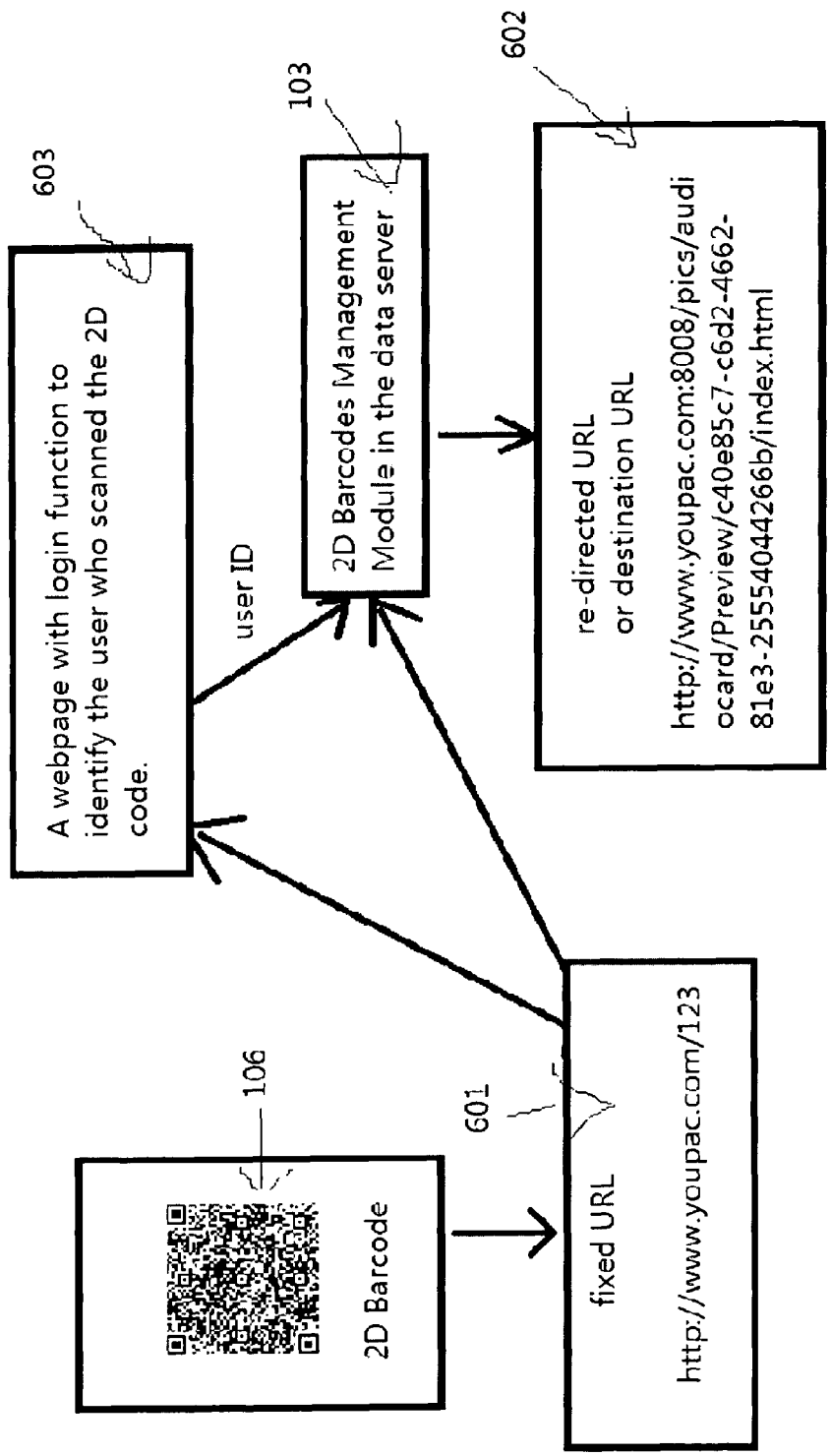

UBIQUITOUS PERSONALIZED LEARNING EVALUATION NETWORK USING 2D BARCODES

FIELD OF INVENTION

This invention relates to 2 Dimensional Code, E-learning, E-commerce, Advertising, publishing, books, toys and internet of things.

BACKGROUND OF THE INVENTION 2D barcodes are two dimensional codes comprising data, they can store website URL's, plain text, phone numbers, email addresses and pretty much any other alphanumeric data. They can be read using a 2D barcode scanner which are available on most of the mobile devices. There are several variations of the 2D barcodes, such as Quick Response Codes (QRC), and Microsoft Tag etc.

A 2D barcode can be static, of which the contents are fixed. It always points to the same web URL address or other fixed contents. A dynamic 2D barcode is the barcode that the web URL address it points to can be changed from a backend server. It consists of a fixed URL (usually short), which can then be re-directed to a new destination URL, and the new destination URL can be changed from the data server, so that effectively, a user who scan the 2D barcode can see contents from different webpages from time to time.

2D barcodes are the best tool to bridge the physical world with the online world. With the popularity of smart phones which users can easily download 2D barcode scanners, the 2D barcodes have been widely adopted by advertisers, manufactures, retailers, and many businesses.

But there is one problem with the existing dynamic 2D barcodes: all the users that scan the same barcode will see the same contents. Apparently it would be desirable for a user to scan a barcode and see contents that is more relevant to him. So the 2D barcode has to be personalized so that each person who scan the same barcode will see different contents! This is exactly one part of the patent claim.

On the other hand, people (especially kids) read lots of paper books, or play with toys or other physical things. But how can we know they really understand the contents in the books or how the toy works? This means that we need an offline learning evaluation system so that we can know how well the user understand the books or toys or other physical things. This is also one aspect of the invention: for each book, or toy, or other physical things, we make quizzes covering the topic, then we make 2D codes for these quizzes. User can scan these 2D barcodes and take the quizzes. The quizzes can be checked and the results can be send back to the backend server for recording. For the quizzes, we can also let the user know the correct answers after they took the quizzes.

Another aspect of the invention is that for each skill (for example, reading skill, math skill etc), we build a ladder system to indicate the level of the skill, and the tasks that needed to advance to the next level. Each task can be a book reading, or a quiz, or a game or other tasks to be assigned. The criteria of whether the user can be advanced to the next level is also defined as a separate module.

The grading of each task can be automatic or manual, or both. If it's automatic, then after the user finished the reading or finished the quiz, the results will be sent back to the server by the computer network without any human approval; if it's manual, then it needs to be approved by a judge (a teacher, for example) for the results to be used in determine the result of the task.

Each task will be linked with one 2D barcode, so that user can scan the barcode and do that task.

Another aspect of the invention is that there is an account for each user, when a user scan the barcode, we will identify the user's ID using an user ID verification module, then we can direct the barcode's URL to an URL that's relevant to the user. For example, we may direct the user to a new book, or a new quiz or new task that's suitable for this user's skill level, rather than the prior art that all users are directed to the same web URL.

The mobile communication device can have a task reader (such as a E-book reader). After 2D barcode is scanned, the task contents (quizzes, games etc) can be downloaded to the mobile communication device. This will make the contents be played with better qualities. After the task is done, the results will be uploaded to the data server.

The users can also download the task contents to the mobile communication device directly from the data server without scanning any 2D barcodes. After the task is done, the results will be uploaded to the data server.

Another aspect of the invention is that after the user scanned the barcode, did the quiz or passed the game, the results can also be used as instructions to control another device, such as open/close a lock; control a toy etc. The devices can be communicated through wireless protocol, or USB, or other device interfaces.

SUMMARY OF THE INVENTION

In accordance with one aspect of the invention, a ubiquitous personalized learning evaluation network with 2D barcodes consists of a data server with user data management module and 2D barcodes management module, mobile communication devices with 2D barcode scanners and user ID recognition module, and 2D barcodes whose destination URLs are determined by the user data management module and 2D barcodes management module, so users scan the same 2D barcode can be re-directed to different contents.

In accordance with one other aspect of the invention, the user data management module has a skill management module, which lists the skills, and the levels for each skill, the tasks (quizzes, games, or other tasks) needed for each skill level, the method to determine the quality of the tasks, and the criteria to determine how a user can advance to the next skill level, and the actual completion history of each task.

In accordance with one other aspect of the invention, each task is linked to a 2D barcode, which can be put on websites, paper books, toys, or any other places, so that the users can do the tasks anytime and anywhere.

In accordance with one other aspect of the invention, the skill management module can determine the user's skill level based on tasks completed, and deliver proper contents to the 2D barcode, so that when a user scan the barcode, he will be assigned the tasks that's tailored to his skill level.

In accordance with one other aspect of the invention, the grading of each task can be automatic or manual, or both.

In accordance with one other aspect of the invention, the mobile communication device can have a task reader (such as a E-book reader). After 2D barcode is scanned, the url linked with the 2D barcode will return data to the task reader. The data can be in webpage, xml, json or other data formats. The task reader can then retrieve task contents (quizzes, games etc) and download them to the mobile communication device. This will make the contents to be played with better qualities. After the task is done, the results will be uploaded to the data server.

In accordance with one other aspect of the invention, the users can also download the task contents to the mobile communication device directly from the data server without scanning any 2D barcodes. After the task is done, the results will be uploaded to the data server.

In accordance with one other aspect of the invention, after the user scanned the 2D barcode, finish the tasks linked with it. The outcome of the tasks can be used to control other devices through wireless communication protocols, USB or other device communication interfaces.

In accordance with one other aspect of the invention, a ubiquitous network with 2D barcodes consists of a data server with 2D barcodes management module, mobile communication devices with 2D barcode scanners, and 2D barcodes whose destination URLs contain quizzes, games or instructions for some tasks. When the user is doing the quizzes, games or other tasks linked with the 2D barcodes, the outcome can be used to control other devices through wireless communication protocols, USB or other device communication interfaces.

BRIEF DESCRIPTION OF THE DRAWINGS

FIG. 9. shows another method to enable different users who scan the same 2D barcode see different contents. The fixed URL for the 2D barcode leads to a login page, so that after login, the user ID is uploaded to the backend 2D barcode management module to determine what should be the proper contents for this user.

DETAILED DESCRIPTION OF THE INVENTION

The present invention relates to a Ubiquitous Personalized learning evaluation network using 2D Barcodes. The following description is presented to enable one of ordinary skill in the art to make and use the invention as provided in the context of a particular application and its requirements. Various modifications to the preferred embodiment will be apparent to those with skill in the art and the general principles defined herein may be applied to other embodiments. Therefore, the present invention is not intended to be limited to the particular embodiments shown and described, but is to be accorded the widest scope consistent with the principles and novel features herein disclosed.

Figure 1:
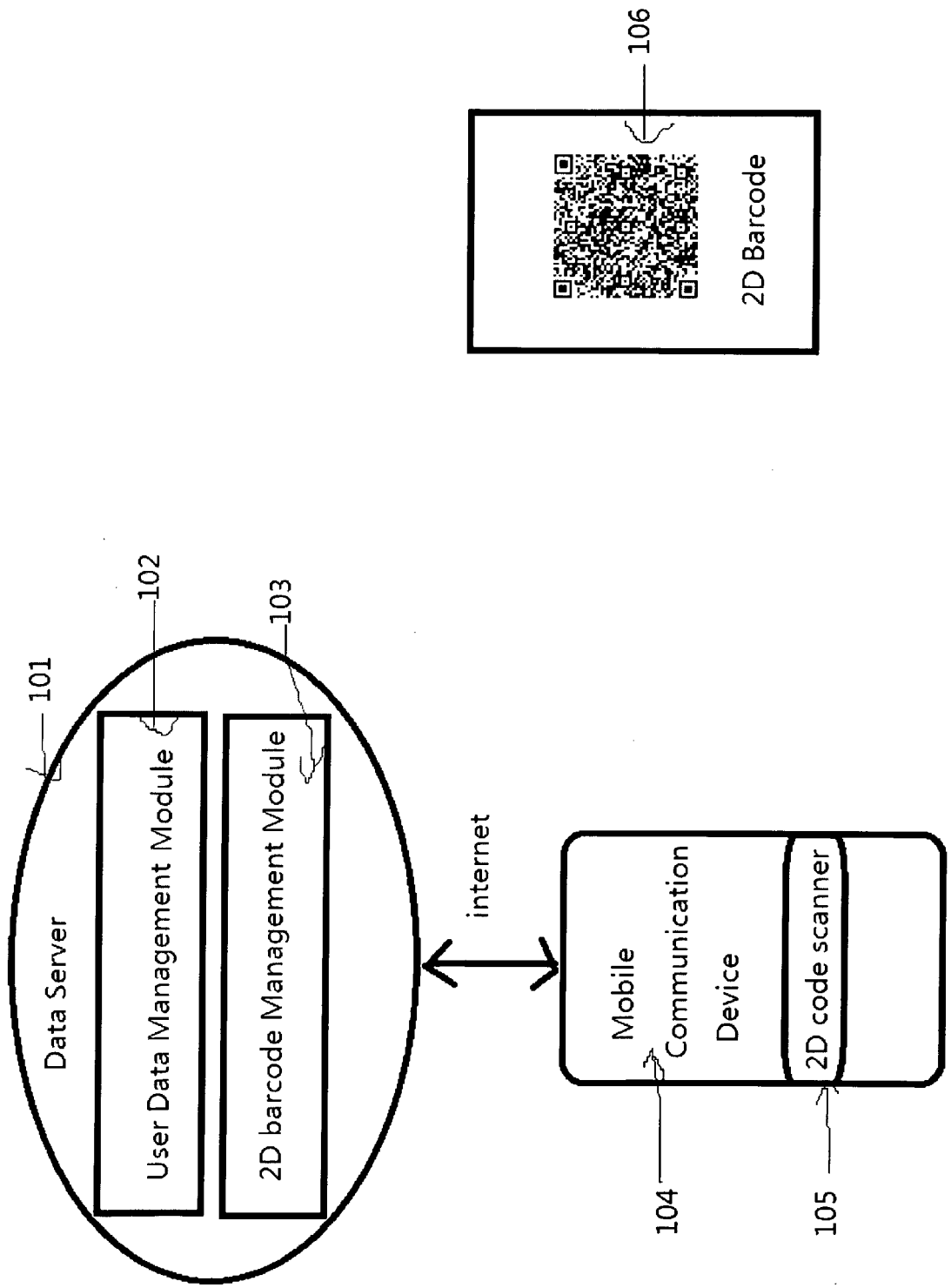
FIG. 1 is a schematic representation of the ubiquitous personalized learning evaluation network with 2D barcodes consists of a data server with user data management module and 2D barcode management module, mobile communication devices with 2D barcode scanners, and 2D barcodes.
Figure 2:
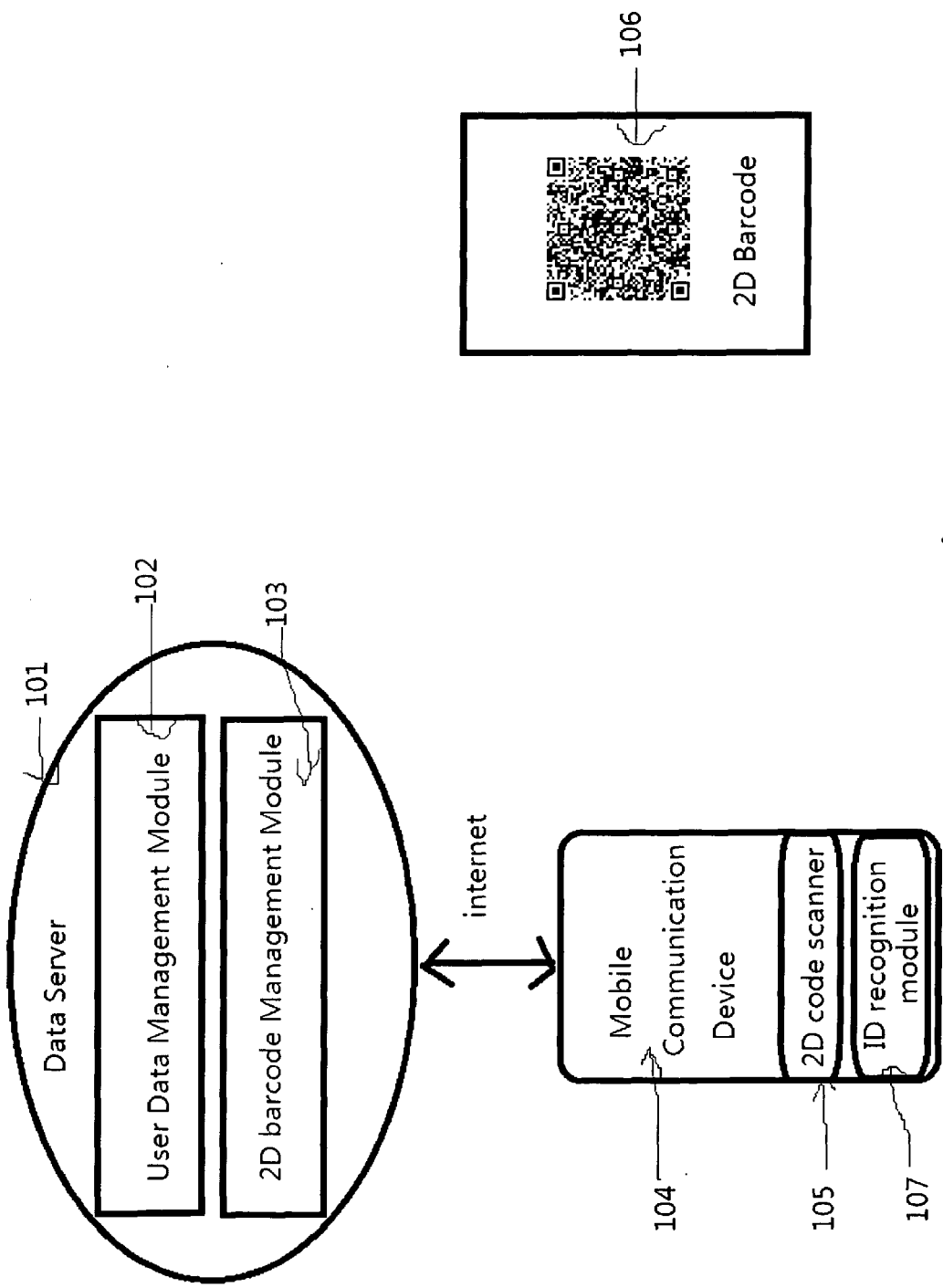
FIG. 2 is a schematic representation of the ubiquitous personalized learning evaluation network with 2D barcodes consists of a data server with user data management module and 2D barcode management module, mobile communication devices with 2D barcode scanners and user ID recognition module, and 2D barcodes.
Figure 3:
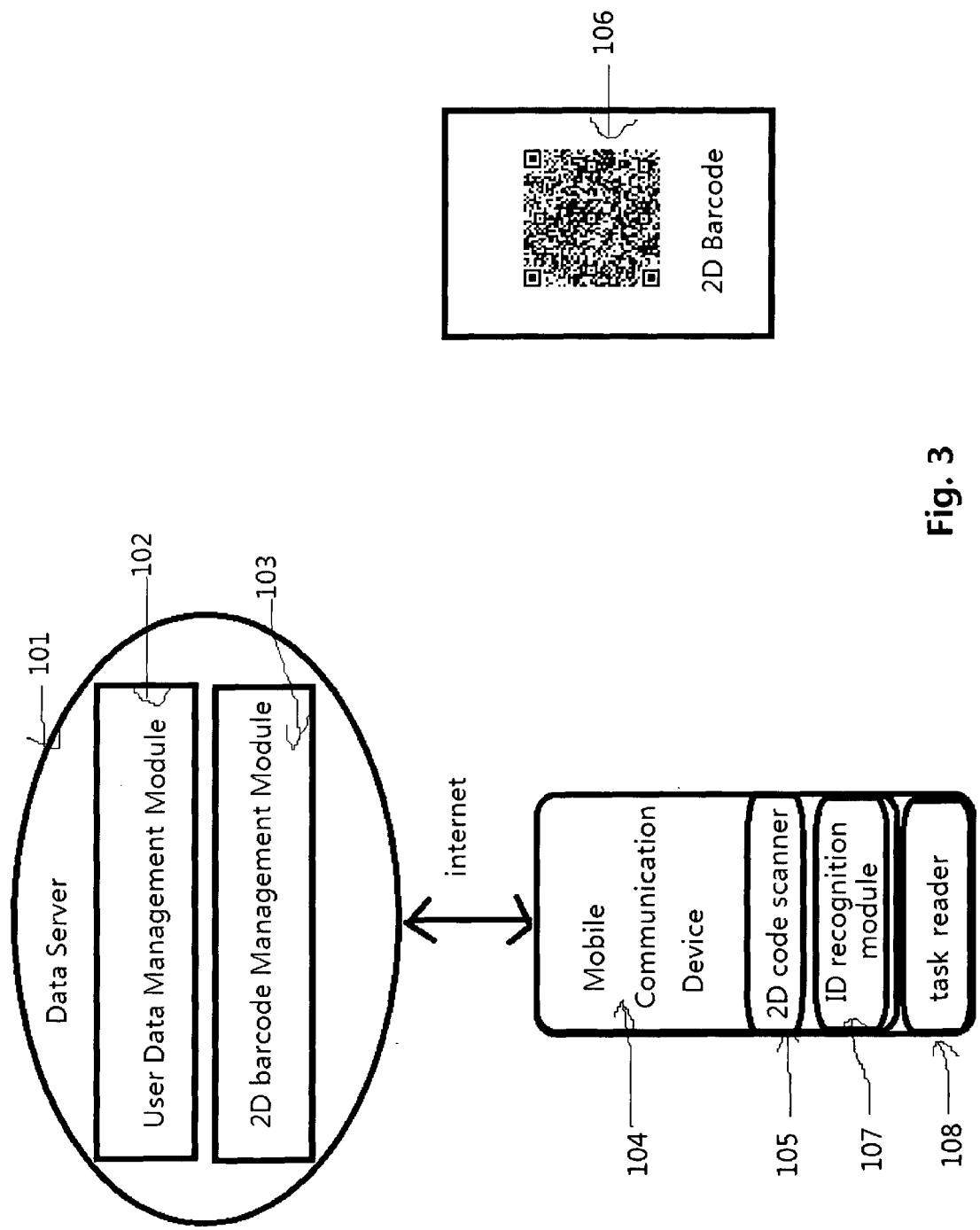
FIG. 3 is a schematic representation of the ubiquitous personalized learning evaluation network with 2D barcodes consists of a data server with user data management module and 2D barcode management module, mobile communication devices with 2D barcode scanners, user ID recognition module and task reader, and 2D barcodes.

As shown in FIG. 1 to FIG. 3, the said invention of a ubiquitous personalized learning evaluation network with 2D barcodes consists of a data server 101 with User Data Management Module 102 and 2D Barcode Management Module 103, mobile communication devices 104 with 2D barcode scanners 105 and user ID recognition module 107, and 2D barcodes 106 placed anywhere.

Figure 5:
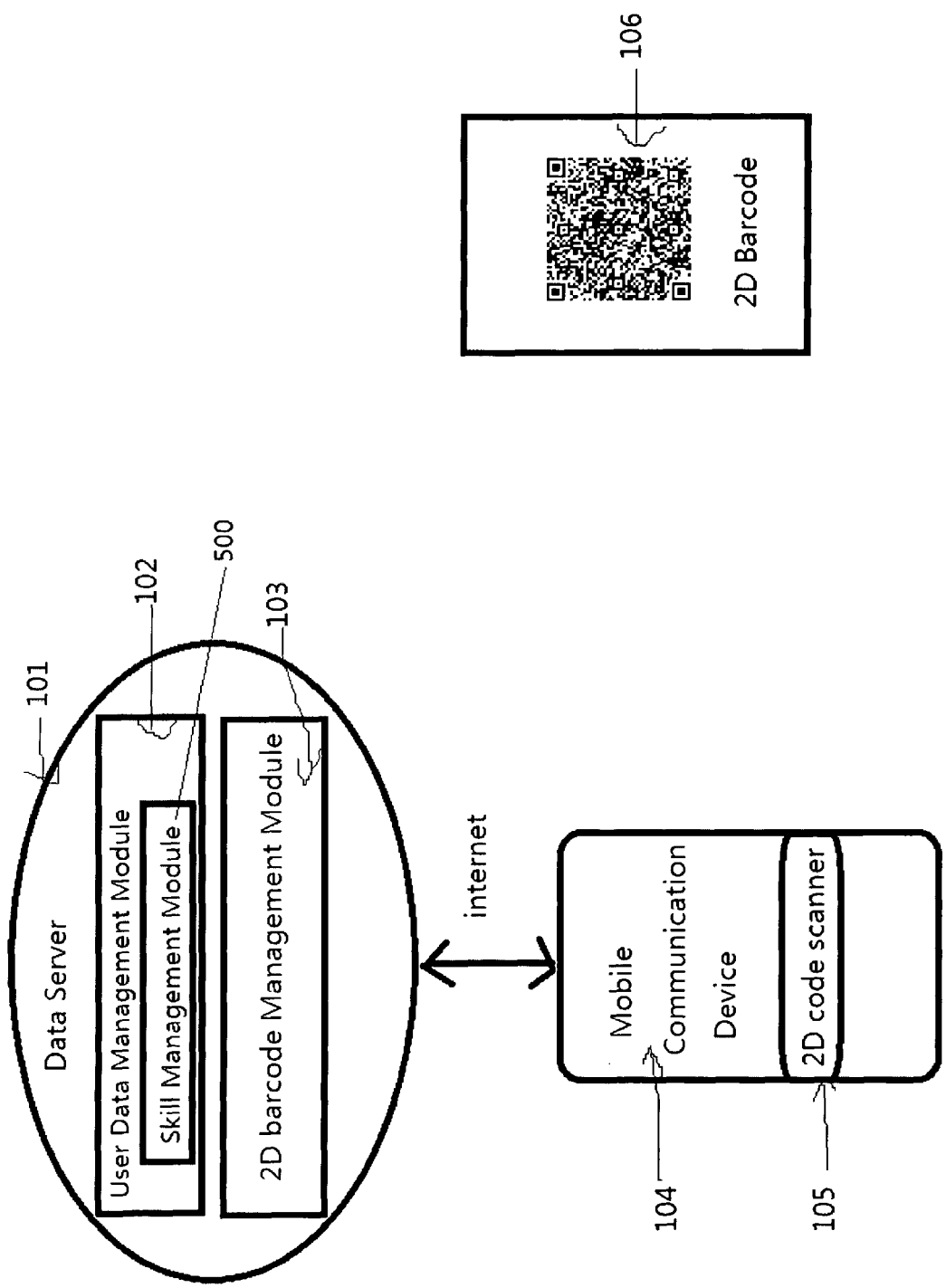
FIG. 5. shows that there is a Skill Management Module in the User Data Management Module.
Figure 6:
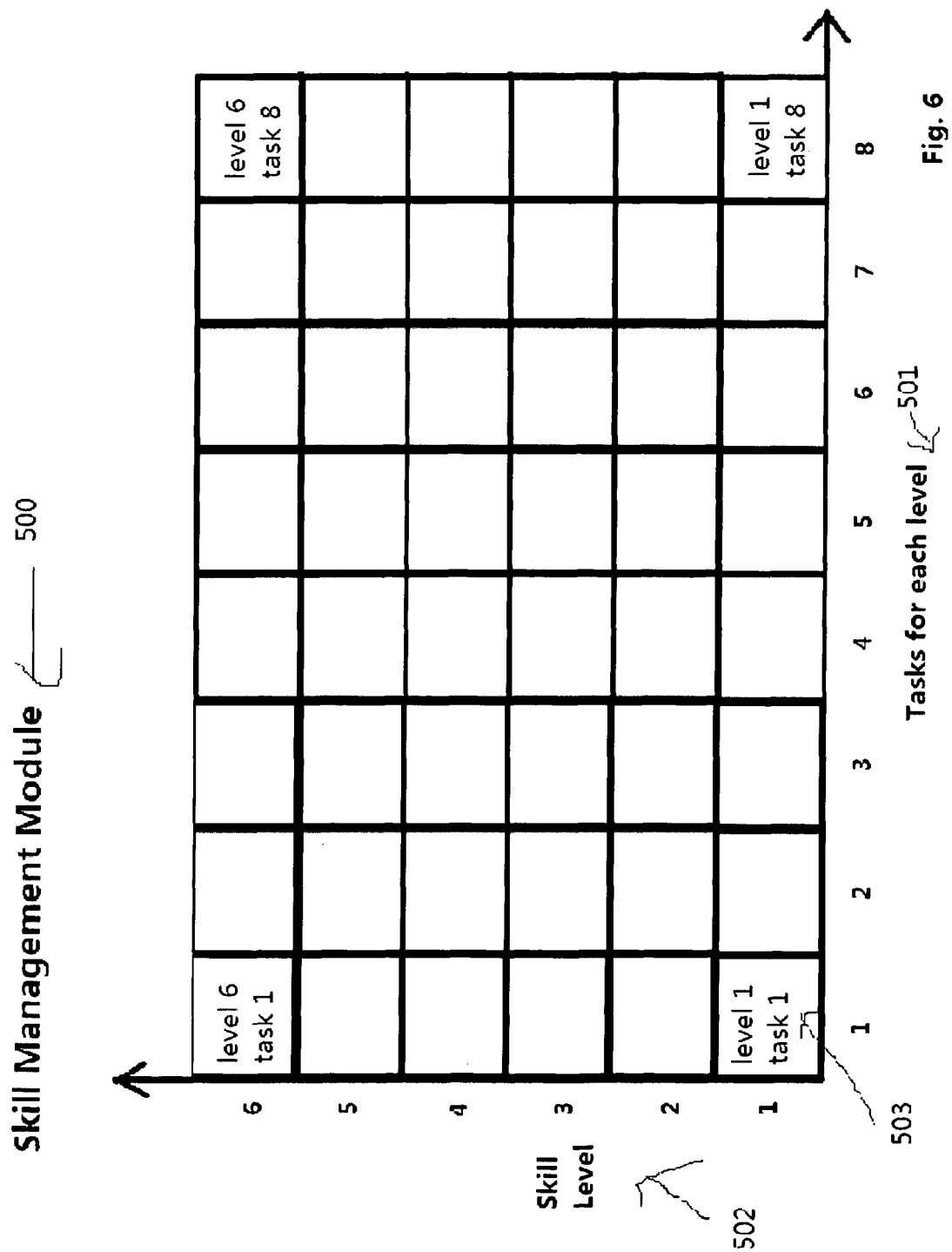
FIG. 6. Shows the skill management module in the user data management module, it lists all the skills, the levels for each skill, the tasks (quizzes, games or other tasks) needed for each skill level. The method to determine the quality of the tasks. And the criteria to determine how a user can advance to the next skill level, and the actual completion history of each task.

FIG. 5 & FIG. 6 show that the user data in the User Data Management Module 102 includes not only the user name, sex, contact info, etc, but also a Skill Management Module 500, which lists the skills, and the levels for each skill 502, the tasks 503 (quizzes, games, or other tasks) needed for each skill level 502, also the method to determine the quality of the tasks, and the criteria to determine how a user can advance to the next skill level, and the actual completion history of each task.

Each task in the Skill Management Module 500 is linked to a 2D barcode 106, which can be put on websites, paper books, toys, or any other places, so that the users can do the tasks anytime and anywhere.

Figure 7:
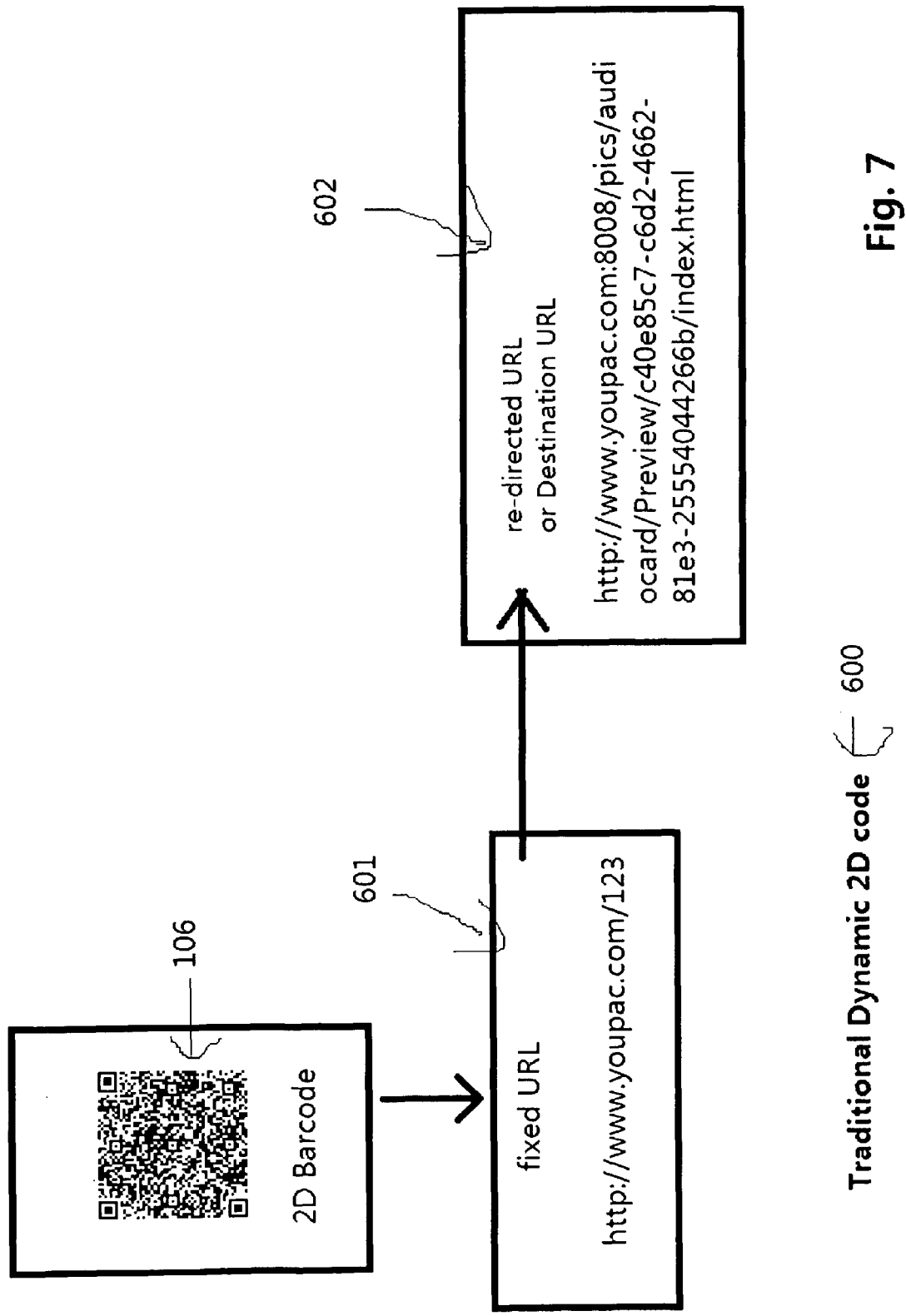
FIG. 7 shows the mechanism of a traditional dynamic 2D barcode: A dynamic 2D barcode is the barcode that the destination URL address it points to can be changed by the 2D barcode management module. It consists of a fixed URL, which can then be re-directed to another URL, and the new URL can be changed. So effectively, a user who scan the 2D barcode can see contents from different websites. But all users who scan the 2D barcode will see the same contents.

FIG. 7 shows a traditional dynamic 2D code. It consists of a fixed URL 601 (usually short), which can then be re-directed to a new destination URL 602, and the new destination URL 602 can be changed from the data server, so that effectively, a user who scan the 2D barcode 106 can see contents from different webpages from time to time. But all the users who scanned the same 2D code 106 will see the same contents.

Figure 8:
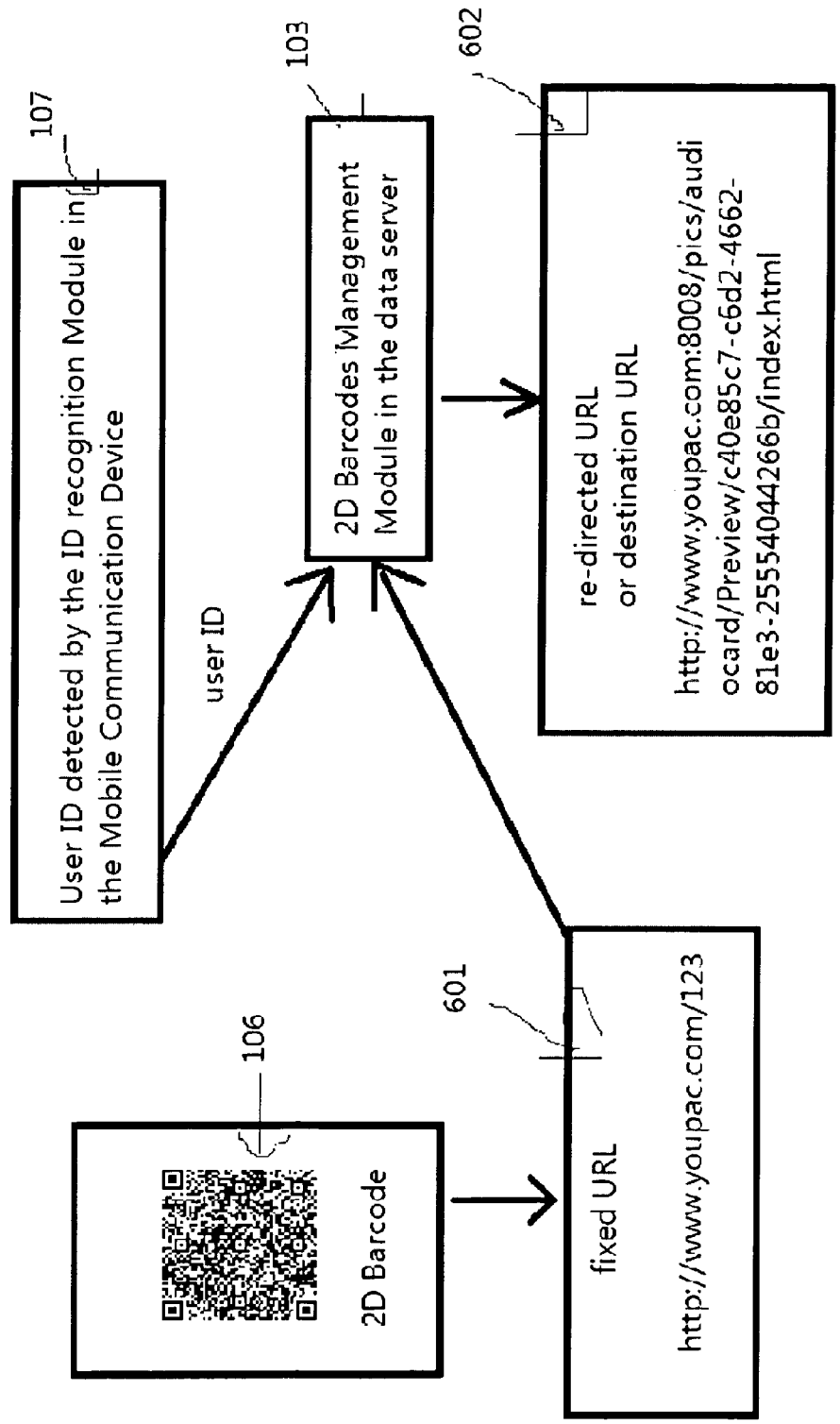
FIG. 8 shows one method to enable different users who scan the same 2D barcode see different contents. Our program on the mobile communication device has an ID recognition module, which can identify the user before or after he scanned the 2D barcode. These information is uploaded to the backend 2D barcode management module to determine what should be the proper contents for this user.

As shown in FIG. 8, the user ID recognition module 107 in the mobile device may identify the user by account login, phone number, email address, facial or thumb image etc. The user ID recognition module 107 can identify the user before or after he scanned the 2D code, FIG. 9 shows that the fixed URL of the 2D code may contain a web page 603 for the user to login, which is another way to identify the user.

FIG. 8 and FIG. 9 shows that after the user scanned the 2D code 106 and his identity is identified by either the ID recognition module 107 or by the webpage with login 603, the backend 2D Barcode Management Module 103 can direct the user to a personalized link determined by this 2D code and the identity of the user. So that different user can see different contents, even though they scanned the same 2D code.

Also after the user scanned the 2D code 106, and finished the task 503 linked to the 2D code, the completion results of the task will be uploaded to the Skill Management Module 500.

The grading of each task 503 can be automatic or manual, or both. If it's automatic, then after the user finished the task 503, the results will be sent back to the Skill Management Module 500 by the computer network without any human approval; if it's manual, then it needs to be approved by a judge (a teacher, for example) for the results to be used in determine the result of the task.

The Skill Management Module 500 can determine the user's skill level based on tasks 503 completed, and deliver proper contents to each 2D barcode, so that when a user scan the barcode 106, he can be assigned the tasks that's tailored to his skill level 502.

FIG. 3 shows that the mobile communication device 104 can have a task reader 108 (such as a E-book reader). After 2D barcode 106 is scanned, the url 601 or 602 linked with the 2D barcode 106 will return data to the task reader 108. The data can be in webpage, xml, json or other data formats. The task reader 108 can then retrieve task contents (quizzes, games etc) and download them to the mobile communication device 104. This will make the contents be played with better qualities. After the task is done, the results will be uploaded to the Skill Management Module 500.

The users can also download the task 503 contents to the mobile communication device directly from the data server without scanning any 2D barcodes. After the task is done, the results will be uploaded to the Skill Management Module 500.

Figure 4:
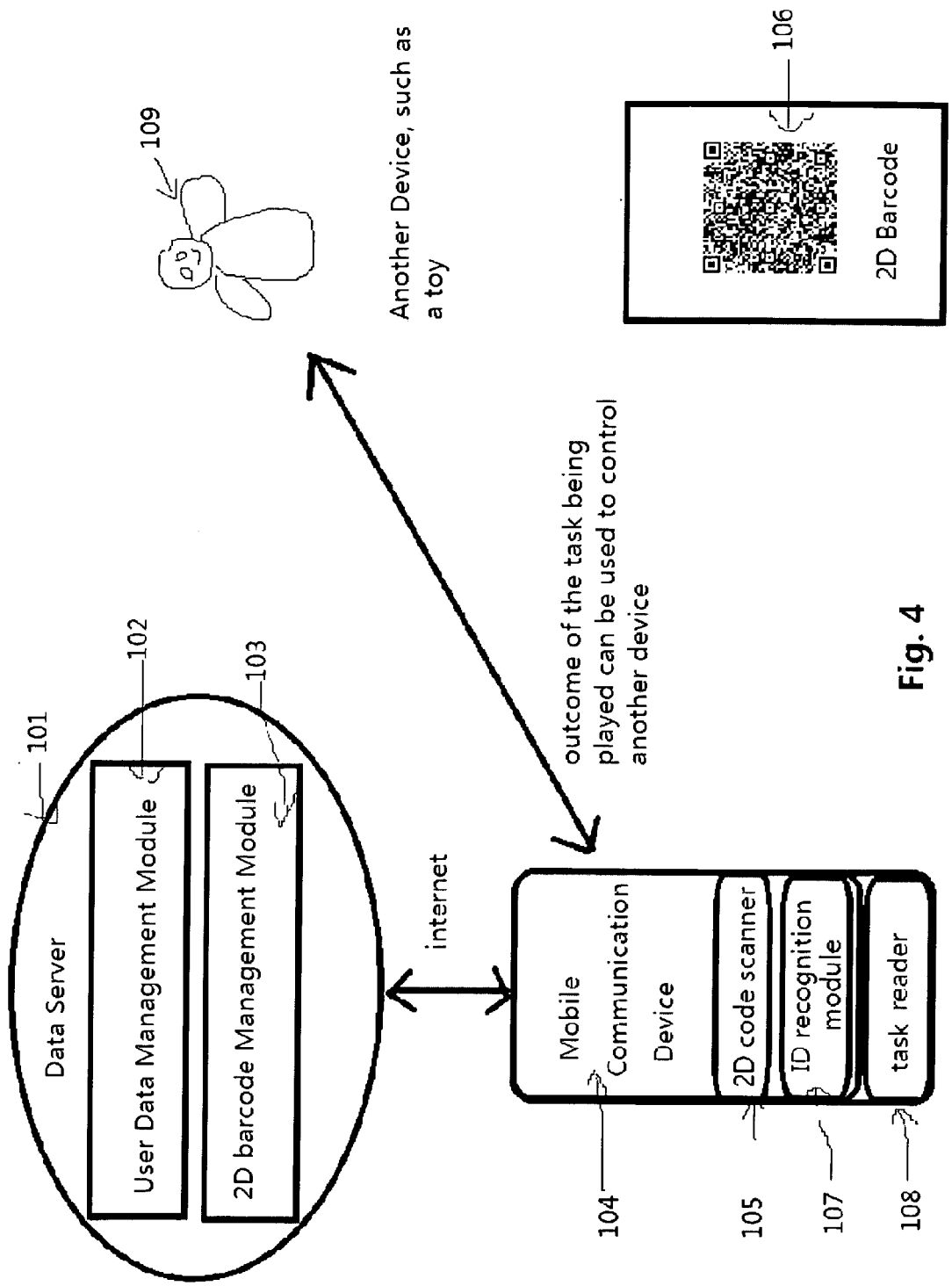
FIG. 4 is a schematic representation of the ubiquitous personalized learning evaluation network with 2D barcodes consists of a data server with user data management module and 2D barcode management module, mobile communication devices with 2D barcode scanners, user ID recognition module and task reader, 2D barcodes, and another device that the mobile communication device can control using the outcome of the task.

FIG. 4. shows that after the user scanned the 2D barcode 106, opened the tasks 503 linked with it. The outcome of the tasks 503 can be used to control other devices 109 through wireless communication protocols (such as bluetooth), USB or other device communication interfaces. For example, the 2D barcode 106 on a toy may be linked to a task 503 including game or quiz, the user can then control the toy 109 (control the toy's voice or motion or other functions) using the outcome of the game or quiz. Of course additional devices needed to be installed in the toy to communicate with the mobile communication device 104 and to control the toy 109.

One other aspect of the invention is a ubiquitous network with 2D barcode comprising: a data server with 2D barcode management module 103, mobile communication devices 104 with 2D barcode scanners 105, 2D barcodes 106 whose destination URLs 602 contain quizzes, games or instructions for some tasks. When the user is doing the quizzes, games or other tasks linked with the 2D barcodes 106, the outcome can be used to control other devices 109 through wireless communication protocols, USB or other device communication interfaces.

The following claims are therefore made:

1. A computer-implemented method comprising:
receiving, from a first client device, a first request comprising a first user identifier, wherein the first request is generated by the first client device based on scanning a two-dimensional barcode, the barcode encoding a set of alphanumeric characters;
retrieving, based on the first user identifier, a first profile information associated with a first user, wherein the first profile information comprises a first skill level associated with the first user;
generating, based on the first profile information, a first response;
transmitting, to the first client device, the first response;
receiving, from a second client device, a second request comprising a second user identifier, wherein the second request is generated by the second client device based on scanning the two-dimensional barcode;
retrieving, based on the second user identifier, a second profile information associated with a second user, wherein the second profile information comprises a second skill level associated with the second user;
generating, based on the second profile information, a second response; and
transmitting, to the second client device, the second response.

2. The method of claim 1, wherein the first client device and the second client device comprise a single physical device.

3. The method of claim 1, wherein:
the first response comprises a first uniform resource locator (URL) and the second response comprises a second URL,
the receiving the first request comprising the first user identifier comprises receiving a first Hypertext Transfer Protocol (HTTP) request generated by the first client device upon scanning the two-dimensional barcode, and
the receiving the second request comprising the second user identifier comprises receiving a second Hypertext Transfer Protocol (HTTP) request generated by the second client device upon scanning the two-dimensional barcode.

4. The method of claim 1, wherein the first skill level associated with the first user may be determined by a first age of the first user, and the second skill level associated with the second user may be determined by a second age of the second user.

5. The method of claim 1, wherein the first response provides access to one or more first tasks selected based on the first skill level associated with the first user, and the second response provides access to one or more second tasks selected based on the second skill level associated with the second user.

6. The method of claim 5, further comprising:
receiving, from the first client device, one or more first results associated with the one or more first tasks;
storing first results information associated with the first user profile;
receiving, from the second client device, one or more second results associated with the one or more second tasks; and
storing second results information associated with the second user profile.

7. The method of claim 6, wherein:
the one or more first tasks comprises one or more first quizzes, tests, homework assignments, games, reading assignments, sports activities, or physical activities,
the first results information comprises one or more first answers, scores, performance metrics, or evaluation metrics received from the first client device, the one or more second tasks comprises one or more second quizzes, tests, homework assignments, games, reading assignments, sports activities, or physical activities, and the second results information comprises one or more second answers, scores, performance metrics, or evaluation metrics.

8. The method of claim 6, further comprising:

based on the one or more first results, transmitting, to the first client device, instructions for the first client device to activate a functionality of an electronic device.

9. The method of claim 8, wherein the electronic device comprises a toy, and wherein the functionality allows the first client device to control the toy's voice or motion.

10. The method of claim 1, wherein the first user identifier is input into the first client device in response to a prompt generated upon scanning the two-dimensional barcode.

11. The method of claim 10, wherein the prompt comprises a webpage with a login functionality.

12. The method of claim 1, wherein the first user identifier is input into the first client device in response to installing an application.

13. The method of claim 12, wherein the first user identifier is input through a facial recognition module or a thumb-image recognition module.

14. A system comprising:

a memory;

at least one processor coupled to the memory and configured to:

receive, from a first client device, a first request comprising a first user identifier, wherein the first request is generated by the first client device based on scanning a two-dimensional barcode, the barcode encoding a set of alphanumeric characters;

retrieve, based on the first user identifier, a first profile information associated with a first user, wherein the first profile information comprises a first skill level associated with the first user;

generate, based on the first profile information, a first response;

transmit, to the first client device, the first response;

receive, from a second client device, a second request comprising a second user identifier, wherein the second request is generated by the second client device based on scanning the two-dimensional barcode;

retrieve, based on the second user identifier, a second profile information associated with a second user, wherein the second profile information comprises a second skill level associated with the second user;

generate, based on the second profile information, a second response; and transmit, to the second client device, the second response.

15. The method of system of claim 14, wherein the first response comprises a first uniform resource locator (URL) and the second response comprises a second URL.

16. The system of claim 14, wherein:

the first request comprises a first Hypertext Transfer Protocol (HTTP) request generated by the first client device upon scanning the two-dimensional barcode, and the second request comprises a second Hypertext Transfer Protocol (HTTP) request generated by the second client device upon scanning the two-dimensional barcode.

17. A non-transitory computer-readable device having instructions stored thereon that, when executed by at least one computing device, causes the at least one computing device to perform operations comprising:

receiving, from a first client device, a first request comprising a first user identifier, wherein the first request is generated by the first client device based on scanning a two-dimensional barcode, the barcode encoding a set of alphanumeric characters;

retrieving, based on the first user identifier, a first profile information associated with a first user, wherein the first profile information comprises a first skill level associated with the first user;

generating, based on the first profile information, a first response;

transmitting, to the first client device, the first response;

receiving, from a second client device, a second request comprising a second user identifier, wherein the second request is generated by the second client device based on scanning the two-dimensional barcode;

retrieving, based on the second user identifier, a second profile information associated with a second user, wherein the second profile information comprises a second skill level associated with the second user;

generating, based on the second profile information, a second response; and transmitting, to the second client device, the second response.

18. The non-transitory computer-readable medium of claim 17, wherein the first response comprises a first uniform resource locator (URL) and the second response comprises a second URL.

* * * * *